3,582,506
FOUNDRY COMPOSITION COMPRISING GRANULATED BASE MATERIAL, POLYISOCYANATE AND ALKYD RESIN MODIFIED WITH OIL AND POLYAMIDE RESIN

Teo Paleologo, Bettino Passalenti, Osvaldo Fiorani, and Ugo Nistri, Milan, Italy, assignors to Società Italiana Resine S.p.A., Milan, Italy
No Drawing. Filed Feb. 17, 1969, Ser. No. 799,977
Claims priority, application Italy, Feb. 17, 1968, 12,874/68
Int. Cl. B22c 1/22, 9/02
U.S. Cl. 260—22
20 Claims

ABSTRACT OF THE DISCLOSURE

A moulding sand in which the binder comprises a mixture of a polyamide- and oil-modified alkyd resin and an isocyanate selected from diisocyanates and polyisocyanates and the catalyst comprises at least one substance selected from organic peroxides, inorganic peroxides, amines, and salts of copper, lead, cobalt, tin and zinc.

---

The invention relates to moulding sands.

Foundry cores are manufactured from moulding sands comprising a granulated base material such as sand, quartz, or powdered ore and an organic binder, a moulding and hardening process providing a core of the desired shape from the granulated material, capable of withstanding pressures from the casting of the metal.

A number of processes are known for moulding foundry cores, as well as a number of binders conferring the necessary compactness or strength to the cores.

All known methods are based on a moulding process by which the granulated base material mixed with or coated by the binder is charged to a suitable mould, the mass being subsequently hardened with or without heat, normally in the presence of hardening accelerators or catalysts.

German patent specification No. 880,467 relates to the manufacture of foundry cores from a granulated material and an organic binder comprising a polyester resin, having unreacted hydroxyl, amino, or sulph-hydryl groups, and a diisocyanate or polyisocyanate.

This type of binder is satisfactory, though with some drawbacks; more particularly, the hardening time in the cold is rather long and the strength of the hardened core is not very high.

It has now been found that substantially improved results are obtained in manufacturing foundry cores by utilizing a moulding sand comprising a granulated base material, an organic binder and a catalyst, characterised in that the binder comprises a mixture of polyamide- and oil-modified alkyd resin and an isocyanate selected from diisocyanates and polyisocyanates and the catalyst comprises at least one substance selected from organic peroxides, inorganic peroxides, amines, and salts of copper, lead, cobalt, tin and zinc.

The use of oil-modified alkyd resins relies on their improved consistency (compatibility) with polyamide resins.

In the specification we understand by the term "alkyd resins" oil-modified alkyd resins, and by the term "modified alkyd resins" alkyd resins that have been modified with oil and further modified with polyamide resins.

Polyamide resins useful for the purposes of the invention comprise the polymerization products of diamines or polyamines with dimeric acids, the latter term being used to denote for example the compounds of the type known by the trade name "Empol." These polyamide resins suitably have a relatively low molecular weight and a melting point of 80 to 200° C. approximately.

Among commercial polyamide resins, those known by the trade name "Versamid" have been found useful for the purposes of the invention.

Polycondensation products obtained from dicarboxylic acids or anhydrides thereof with polyhydric alcohols have been found more particularly advantageous as alkyd resins where the ratio of the number of hydroxyl groups to the number of carboxyl groups, whether free or in the form of anhydrides, is between 1.2:1 and 4.5:1, preferably 1.5:1 to 3.6:1, the condensation being carried out in the presence of oil in a quantity not exceeding 50% by weight with respect to the other monomers.

Among the polyhydric alcohols which are preferred for the purposes of the invention are hexane-triol and pentaerythritol, among dicarboxylic acids, phthalic acid or the anhydride thereof may be mentioned. The oils may for example be fish, soya bean, castor, or linseed oils.

The quantity of polyamide resin preferably amounts to 0.1 to 5% by weight with respect to the alkyd resin, advantageously over 0.2% the more particularly preferred quantities amounting to 0.5 to 2.5% by weight. It has been found that quantities exceeding 5% by weight may imply an excessively short hardening period when the modified resin is employed together with the isocyanates, whereas quantities below 0.1% by weight may not give any appreciable advantage.

In order to obtain the modified alkyd resins, the polycarboxylic acids, polyhydric alcohols and oils are condensed in the presence of the polyamide resin.

Such condensations, which are carried out in the presence of metal oxides, such as lead oxides, are desirably continued until an acid value of the dry matter content below 10, preferably between 4 and 8 is reached.

According to an aspect of the invention the condensation is carried out until a polyamide content in the modified alkyd resin within the abovementioned range is reached.

According to a further aspect of the invention a modified alkyd resin is at first prepared having a polyamide resin content exceeding 5% by weight, and the composition is then restored to within the range defined above. To this end the modified alkyd resin and the non-modified alkyd resin may simply be intermixed; preferably, however, the mixture is treated at a temperature above room temperature in the presence of peroxides and metal salts, such as copper salts. This treatment is usually carried out at temperatures between 40° and 70° C. for a period of 15 minutes to 3 hours.

The modified alkyd resins are conveniently employed in the manufacture of foundry cores after mixing them with suitable solvents, generally of the hydrocarbon type, so that the dry matter content amounts to 65 to 85% by weight.

The isocyanates useful for the purposes of the invention contain two free isocyanate groups at least in the molecule, and are therefore of the diisocyanate or polyisocyanate type. Compounds of the polymethylenepolyphenyl isocyanate type are particularly satisfactory. Preferably the quantity of the isocyanates with respect to the modified alkyd resin is 10 to 40% by weight.

Hardening is promoted by particular catalytic substances which are utilized separately or combined together. These substances belong to the class consisting of organic peroxides, inorganic peroxides, amines and salts of cobalt, lead, tin, zinc and copper. Preferably the organic peroxides are utilized for the purposes of the invention in a quantity of 0.01 to 0.15% by weight with respect to the modified alkyd resin, the inorganic peroxide compounds in a quantity of 3 to 15% by weight and the amines in a quantity of 0.1 to 0.8% by weight.

Metal salts are usually employed in the form of salts of organic acids, the overall metal quantity preferably amounting again to 0.1 to 0.8% by weight with respect to the modified alkyd resin.

The modified alkyd resin and isocyanate are added to the sand, preferably, in the above defined ratios, separately or after mixing them together.

The catalysts may be separately added to the organic binder or they may be mixed with the isocyanates or with the modified alkyd resin on mixing with sand, the former version being preferred when using inorganic peroxide substances, the latter in the other cases.

Still excluding the inorganic peroxides the catalysts can be maintained during prolonged periods in the modified alkyd resin without any damage to the latter.

The preferred catalysts for the purposes of the invention belonging to the above defined classes are: methylethylketone peroxide, sodium perborate, tertiary amines and copper and cobalt in the form of naphthenates and octoates.

In manufacturing foundry cores the quantity of binder with respect to the base material is preferably 0.5 to 2.5% by weight, advantageously 1.0 to 2.0% by weight.

The moulding sands of the invention have for example a shelf life of 15 to 30 minutes and are easily charged to the moulds through their excellent flowability.

After a charging time of the mixture to the mould of, generally, 30 to 70 minutes, the core is of a sufficient green strength to be self-supporting, so that hardening is completed in the absence of the mould, which can be easily loosened from the core.

As will be clearly understood from the experimental examples below, the main advantages of the process of the invention, in addition to quick hardening, are in the mechanical properties of the hardened cores, which are therefore particularly useful for high temperature casting (for example of steel) even when they are of considerable size.

The experimental tests described in the examples were carried out under controlled conditions at a temperature of 20±1° C. and relative humidity of 50±5%.

The sand-binder mixtures were prepared in accordance with the above defined ratios and the following properties were ascertained.

(i) Shelf life: to be understood as the period during which the mixture maintains its mouldability properties unaltered.

In order to determine the shelf life samples are taken from the mixtures at equal intervals from the time of mixing and specimens are formed on which the hardness and flexing resistance are ascertained. The specimens were formed and the tests were carried out in accordance with DIN standards.

(ii) Stripping time: to be understood as the necessary period after which a core of a given size can be removed from the mould and caused to stand without yielding or deforming.

In these tests a wooden mould of a capacity of 5 kgs. sand-binder slurry, open at one end for charging the mixtures, its other walls being closed and suitably shaped to make the stripping test stricter, was employed.

(iii) Hardening time: surface hardness and flexing resistance.

The first two mentioned tests were carried out on cylindrical specimens 50 mm. in diameter and 50 mm. in height, the flexing resistance test was carried out on parallelepipedic specimens 170 mm. in length, 22 mm. in width and 22 mm. in height.

The specimens were moulded in accordance with DIN standards by employing apparatus distributed by Georg Fischer (Switzerland) comprising moulds model GM 879 and model GM 476/1 and a small power hammer of the S.P.R.A. type for pressing the slurry.

Stripping of the green specimens was effected promptly after moulding. The hardening time was ascertained on the cylindrical specimens as the required time for the specimen not to be penetrated by a steel stylus, and hardness was tested at equal time intervals. The latter test was carried out by means of the penetrometer model GM 578 distributed by Georg Fischer, provided with a toothed head reciprocated in rotation, which was caused to perform five on and return strokes. The apparatus gave readings on a scale between zero and eight, wherein zero corresponds to the maximum value and eight to the minimum value of hardness.

The hardness was determined at a plurality of points, more particularly on the top surface, on the inside after cutting the specimen by means of a saw and on the bottom surface which had remained in contact with the base support.

The flexing resistance was ascertained by means of a conventional dynamometer the feed rate of which was adjusted to 5 mm./minute.

EXAMPLE 1

A mixture is prepared by thoroughly intermixing 10,000 parts of sand (of the Torre del Lago type at 60 AFA), 150 parts alkyd resin modified with polyamide and oil, 30 parts polyisocyanate and 10 parts of a solution of cobalt naphthenate.

The modified alkyd resin was obtained by mixing 90 parts by weight of the product obtained by condensing phthalic anhydride, hexantriol and pentaerythritol (50% by weight), wherein the hydroxyl/carboxyl groups ratio is 2.4:1 and fish oil (50% by weight) till an acid value of the dry matter content of 7.9 was reached, with 10 parts by weight of a modified alkyd resin containing 9% by weight polyamide resin.

The modified alkyd resin was obtained by condensing the abovementioned monomers in the presence of a proper quantity of resin known by the trade name "Versamid 930."

The polyisocyanate utilized for this test is the polymethylenepolyphenylisocyanate known by the trade name "Papi." The procedure was carried out as described earlier, the restults being summarized in Table 1.

EXAMPLE 2

Procedure is as in Example 1, the modified alkyd resin obtained after mixing being admixed with 0.5% by weight benzyldimethylamine.

The results are summarized in Table 1.

EXAMPLE 3

10 parts by weight alkyd resin modified with a high content of polyamide and 90 parts by weight of the nonmodified resin, as described in Example 1, are admixed with 0.11 part 50% methylethylketone peroxide and 0.035 part of a toluene solution containing copper naphthenate, the metal content amounting to 6%.

The treatment was carried out on the resins diluted with a solvent in order to obtain a dry matter content of 75%. After homogenizing, the mixture is heated to 60° C. and maintained at this temperature for 1.5 hours. The mixture is then cooled and employed as a binder with the polymethylenepolyphenylisocyanate together with the cobalt salt as described in Example 1.

The results are summarized in Table 1.

EXAMPLE 4

Procedure is as in Example 1, 40 parts polymethylenepolyphenylisocyanate being employed to 10,000 parts sand.

The results are summarized in Table 1.

Comparative run

The binder employed is alkyd resin which has not been modified with polyamide, described in Example 1, in a quantity of 150 parts to 10,000 parts sand, the other conditions being the same as in Example 1. The results are summarized in Table 1.

TABLE 1

| Ex. No. | Shelf life | Minutes Stripping time | Minutes Hardening time | Top hardness after— 2 hrs. | Top hardness after— 3 hrs. | Top hardness after— 4 hrs. | Top hardness after— 24 hrs | Inside hardness after— 2 hrs. | Inside hardness after— 3 hrs. | Inside hardness after— 4 hrs. | Inside hardness after— 24 hrs. | Bottom hardness after— 2 hrs. | Bottom hardness after— 3 hrs. | Bottom hardness after— 4 hrs. | Bottom hardness after— 24 hrs. | Flexing resistance, kg./sp. cm. after— 4 hrs. | Flexing resistance, kg./sp. cm. after— 24 hrs. |
|---|---|---|---|---|---|---|---|---|---|---|---|---|---|---|---|---|---|
| 1 | 20–25 | 50 | 70 | 5.7 | 5.5 | 5.3 | 3.3 | 6.4 | 6.3 | 5.8 | 3.5 | 6.3 | 6.2 | 6.1 | 3.6 | 15.2 | 32 |
| 2 | 20 | 45–50 | 65 | 5.3 | 4.8 | 4.6 | 3.4 | 6.2 | 5.9 | 5.3 | 3.5 | 6.2 | 5.9 | 5.8 | 3.5 | 15.7 | 31.5 |
| 3 | 20 | 45–50 | 65 | 5.2 | 4.6 | 4.3 | 2.8 | 5.8 | 5.8 | 4.7 | 3.0 | 5.7 | 5.2 | 4.9 | 2.9 | 17.1 | 34 |
| 4 | 20 | 45–50 | 65 | 5.2 | 4.7 | 4.2 | 2.8 | 5.7 | 5.7 | 4.8 | 2.9 | 6.0 | 5.3 | 5.0 | 2.9 | 19 | 36.5 |
| G.R. | 20–25 | 65 | 90 | 6.1 | 5.9 | 5.8 | 3.4 | 6.8 | 6.4 | 6.2 | 3.7 | 6.9 | 6.7 | 6.3 | 3.7 | 14.9 | 31 |

What we claim is:
1. In a moulding sand composition for use in manufacturing foundry cores comprising a granulated base material, from 0.5 to 2.5% by weight of an organic binder consisting of a polyisocyanate in combination with a modified alkyd resin, said polyisocyanate being present in an amount of from 10 to 40% by weight based on the modified alkyd resin and a catalyst comprising at least one substance selected from the group consisting of organic peroxides, inorganic peroxides, amines and metal salts, said metal being selected from the group consisting of copper, lead, cobalt, tin and zinc, the improvement comprising the modified alkyd resin component of the binder being an alkyd resin modified with oil and a polyamide resin, said modified alkyd resin being the condensation product obtained on condensing (1) polycarboxylic acid, (2) polyhydric alcohols and (3) oils, in the presence of a polyamide resin, said polyamide resin being the polymerization product of polyamines with dimeric acids and being present in the final condensation product in an amount of from 0.1 to 5% by weight based on the final condensation product.

2. A moulding sand composition according to claim 1 characterized in that the catalyst comprises at least one of the peroxides and amines in combination with at least one of the metal salts.

3. A moulding sand composition according to claim 1 wherein the polycarboxylic acid is a dicarboxylic acid in a form selected from the acid itself and its anhydride, and wherein the ratio of the number of hydroxyl groups in the polyhydric alcohol to the number of carboxylic acid groups (whether free or in anhydride form) in the dicarboxylic acid is 1.2:1 to 4.5:1 and the acid value is at least 10, the oil present during the condensation amounting at most to 50% by weight with respect to the total.

4. A moulding sand composition according to claim 3, characterized in that the ratio is 1.5:1 to 3.6:1.

5. A moulding sand composition according to claim 4, characterized in that the acid value is 4 to 8.

6. A moulding sand composition according to claim 5, characterized that the acid is phthalic acid.

7. A moulding sand composition according to claim 5, characterized in that the polyhydric alcohol is selected from hexantriol and pentaerythritol.

8. A mouling sand composition according to claim 5, characterized in that the oil is selected from fish, soya bean, castor and linseed oils.

9. A moulding sand composition according to claim 1, characterized in that the amount of polyamide resin is at least 0.2%.

10. A moulding sand composition according to claim 1, characterized in that the amount of polyamide resin is 0.5 to 2.5%.

11. A moulding sand composition according to claim 1, characterized in that the isocyanate is polymethylenepolyphenylisocyanate.

12. A moulding sand composition according to claim 1, characterized in that the binder is present in an amount of from 1.0 to 2.0%.

13. A moulding composition according to claim 1, characterized in that the catalyst comprises an organic peroxide in a quantity of 0.01 to 0.15% by weight with respect to the modified alkyd resin.

14. A moulding sand composition according to claim 13, characterized in that the catalyst is methylethylketone peroxide.

15. A moulding sand composition according to claim 1, characterized in that the catalyst is an inorganic peroxide in an amount of 3 to 15% by weight with respect to the modified alkyd resin.

16. A moulding sand composition according to claim 15, characterized in that the catalyst is sodium perborate.

17. A moulding sand composition according to claim 1, characterized in that the catalyst is an amine in an amount of 0.1 to 0.8% by weight with respect to the modified alkyd resin.

18. A moulding sand composition according to claim 17, characterized in that the catalyst is a tertiary amine.

19. A moulding sand composition according to claim 1, characterized in that the catalyst is a metal salt in an amount of 0.1 to 0.8% by weight with respect to the modified alkyd resin.

20. A moulding sand composition according to claim 19, characterized in that the catalyst is a metal salt selected from organic acid salts of copper and cobalt.

References Cited

UNITED STATES PATENTS

| | | | |
|---|---|---|---|
| 2,864,780 | 12/1958 | Katz et al. | 260—18 |
| 3,179,990 | 4/1965 | Freeman | 164—43 |
| 3,249,563 | 5/1966 | Balk | 260—22 |
| 3,255,500 | 6/1966 | Engel et al. | 260—22 |
| 3,345,338 | 10/1967 | Merten et al. | 260—75 |
| 3,371,056 | 2/1968 | Delius | 260—22 |
| 3,426,831 | 2/1969 | Robins et al. | 164—43 |

FOREIGN PATENTS

| | | | |
|---|---|---|---|
| 880,467 | 6/1953 | Germany | 260—22 |
| 966,338 | 8/1964 | Great Britain | 260—22 |

DONALD E. CZAJA, Primary Examiner

R. W. GRIFFIN, Assistant Examiner

U.S. Cl. X.R.

164—43; 260—40